Nov. 26, 1968  C. J. DANIELS  3,412,828

NONREVERSIBLE SHOCK STRUT

Filed Feb. 6, 1967

INVENTOR.
CHARLES J. DANIELS

BY Harry A. Herbert Jr
Arsen Tashjian
ATTORNEYS

United States Patent Office 3,412,828
Patented Nov. 26, 1968

3,412,828
NONREVERSIBLE SHOCK STRUT
Charles J. Daniels, Wilmington, Del., assignor to the United States of America as represented by the Secretary of the Air Force
Filed Feb. 6, 1967, Ser. No. 614,778
2 Claims. (Cl. 188—129)

ABSTRACT OF THE DISCLOSURE

An energy absorbing system for safely dissipating load energy forces generated by a falling body by forcing an elongated tubular member, fixedly attached to one part of the body, through a block having interference means positioned therein attached to another part of the body, the twop arts of the body being movable relative to each other causing the load energy to be absorbed and dissipated while the tubular member is deformed after the first part of the falling body contacts the ground and stops moving and the other part continues to move toward the stopped part.

---

This invention relates to an energy absorbing system for safely dissipating large amounts of impact energy and more particularly is concerned with providing a disposable, nonreversible, one-time shock strut for attachment to each wheel of a vehicle being dropped to the ground from a low-flying cargo aircraft to prevent damage to the vehicle and its contents.

An ideal shock absorber arrangement is one where the retarding force is uniform over the entire length of its stroke. This would produce a constant deceleration of the load and minimize impact damage to the moving object. Shock absorbers which depend on elastic elements, such as springs, rubber bumpers and the like do not absorb most of the energy but merely provide a progressively increasing retarding force as they are depressed until the energy is converted to a different form subject to rebound. This can cause considerable damage to the dropped or moving vehicles and their contents when brought to rest subject to the effect of the rebounding force.

Another consideration in the design and use of shock absorbers is that one which provides a constant retarding force at the maximum acceptable deceleration level can bring a load safely to rest in one half the stroke distance of that required when using the elastic type shock absorber in which the retarding force gradually builds up to the maximum safe level. The constant deceleration device accomplishes its purpose without the danger of rebounding and resultant damage. Of course, the well-known hydraulic type shock absorbers will produce results comparable to the nonreversible type herein disclosed but these are costly and complicated to manufacture and are not generally suitable for use as a one-time shock strut. Thus, the nonreversible shock strut hereinafter described in detail fills the need for a one-time, light weight, and reliable constant force dissipating shock absorbing system particularly for use to prevent damage to vehicles and their contents when dropped from low flying cargo aircraft.

Other heretofore constant decelerating systems in use include the interposition of compressible honeycomb cellular material between the dropped object and the ground. This material operates to absorb the load energy forces and is quite successful where it is simply required that the energy be dissipated over the impact area. However, it is impractical for use where it is desired to provide an arrangement which serves to protect a motor vehicle from damage when it is dropped from a low flying aircraft and still allows for driving the vehicle immediately after impact without unpacking or disengaging any attached material. Other material having physical properties similar to the cellular type described has been used for the purposes mentioned but is not satisfactory for the same reasons.

Accordingly, it is an object of the present invention to provide a nonreversible shock strut which is light weight and simple to construct and dependable in operation.

Another object of the invention is to provide a depending tube assembly which collapses and thereby dissipates the load energy force of a moving object to which it is attached when the object meets an immovable article such as the ground.

A further object of the invention is to provide an energy absorbing system capable of bringing a fast moving vehicle to a halt without damage to the vehicle or its contents.

A still further object of the invention is to provide a device for decelerating a dropped object at a constant rate and yet allow the object, such as a motor vehicle, to be driven away from the drop area immediately after impact.

Still another object of the invention is to provide an impact energy dissipation system which is easily attachable to each wheel of a motor vehicle and which augments the conventional suspension system of the motor vehicle to prevent damage thereto when dropped from a low-flying cargo aircraft.

These and other objects, features, and advantages will become more apparent after considering the following detailed description taken in conjunction with the annexed drawings and appended claims.

In the drawings wherein like reference characters refer to like parts in the several views.

Figures 1, 2, 3:
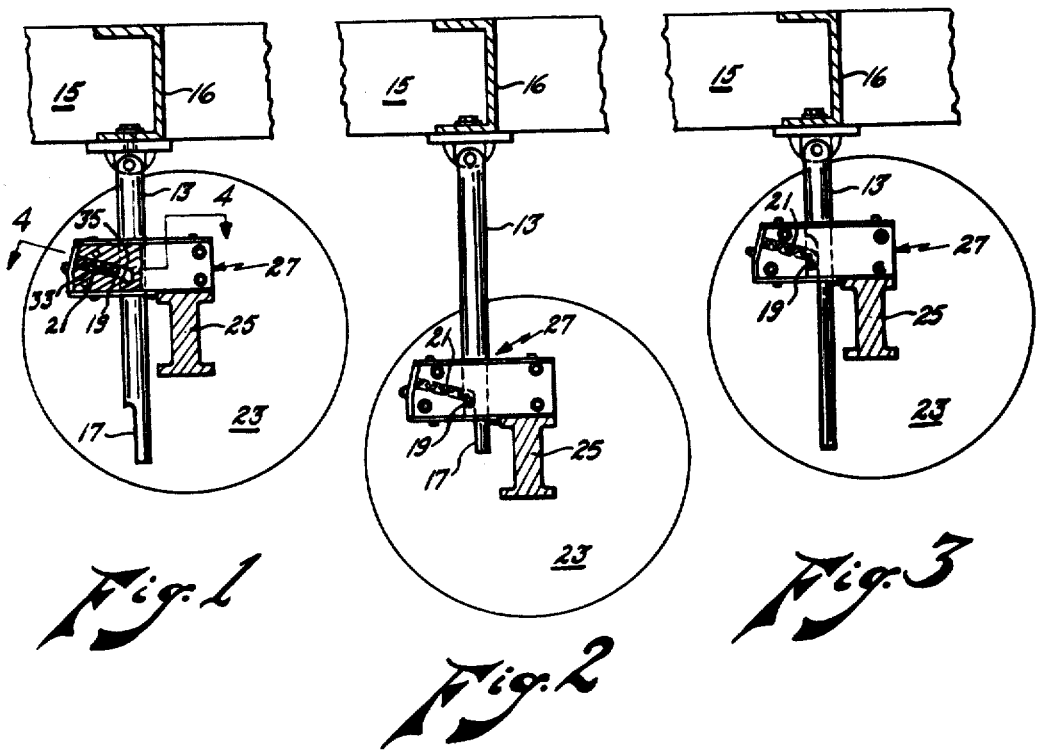
FIGURE 1 is a view in partial cross-section of a shock strut according to the invention attached to a motor vehicle prior to lifting off the ground.
FIGURE 2 is a view in partial cross-section of the shock strut after the motor vehicle has been lifted off the ground and is in the air.
FIGURE 3 is a view in partial cross-section of the shock strut after the motor vehicle has been dropped and the impact energy dissipated.

Referring now to the drawings, the invention includes a collapsible tubular member 13, the upper end of which is attached to a motor vehicle frame section 15 by means of a bracket 16. The lower end of the tubular member 13 is pre-collapsed to form the indentated area 17 into which the movable pin 19 is urged by the biasing spring 21 when the vehicle wheel 23 is in the downwardly extended position as shown in FIGURE 2.

The wheel 23 is attached to the axle 25 and turns thereon. Also attached to the axle 25 is the housing 27 which contains the pin and spring assembly 19 and 21, respectively. A clearance hole 29 is provided in the block 31 in which the tube member 13 is slidably disposed. A downwardly slanted passageway 33 is provided for guiding the pin 19 toward the sidewall of the tube member 13. At the inward end of passageway 33 there is provided a vertical slot portion 35 into which the pin 19 falls at the urging of biasing spring 21 when the tube member 13 is in the withdrawn upward position as in FIGURE 2. The vertical slot portion 35 is disposed in the central portion of the block 31 and extends into the area of the clearance hole 29 and forces the pin 19 to interfere with the passage of the tubular member 13 therethrough when the pin 19 is in position in the slot 35. A considerable amount of energy is required to force the tubular member 13 through the hole 29 when the pin 19 is positioned in the vertical slot portion 35. This energy, which is generated by the falling vehicle, is absorbed and dissipated by the interaction of the various elements of the shock strut.

In operation, a motor vehicle having four wheels such as, for example, a three-quarter ton truck is at rest on the ground near a dock and it is desired to transport it quickly into an area which may be inaccessible over land roads or may require excessive time to accomplish. Logistically, air drop by helicopter would probably be the ideal way to place the vehicle in the required location in the shortest possible time. The present invention provides the means for accomplishing the desired results in the most efficient manner with the least possibility of damage to the vehicle or its contents. This is particularly significant if the contents of the vehicle includes military personnel or sensitive electronic equipment and if it is necessary to leave the scene of the delivery area immediately after impact.

Figure 4:
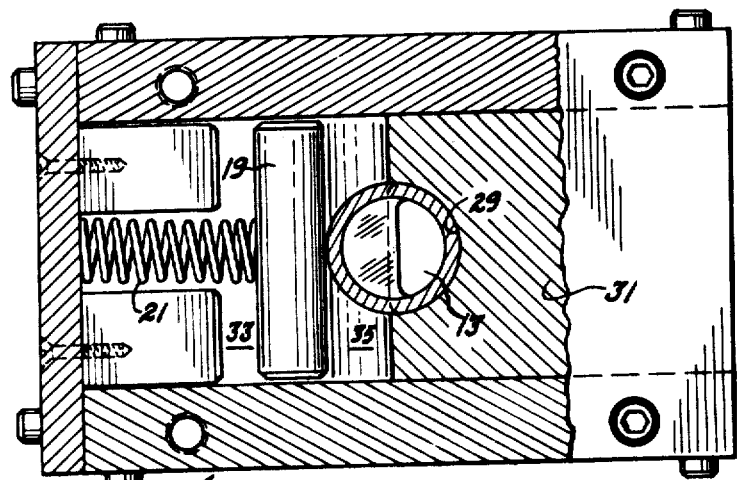
FIGURE 4 is an enlarged view of the shock strut in partial section taken along the line 4—4 of FIGURE 1.

First, the housing 27 with the block 31 disposed therein is fixedly attached to the axle 25 at each wheel of the motor vehicle. The tubular member 13 is then pushed upward through the clearance hole 29 in the block 31 and attached to the bracket 16 which is affixed to the frame section 15 to the vehicle. The pin 19 is then positioned in the slanted passageway 33 and the biasing spring 21 installed to urge the pin 19 against the wall of the tubular member 13. The walls of the housing 27 are then attached and the shock strut is ready for use as shown in FIGURES 1 and 4.

In the example cited, the motor vehicle is then lifted by the helicopter by means of a sling under the frame 15 causing the wheel and axle 23 and 25, respectively, to drop down away from the vehicle frame 15. The housing 27 with the block 31 therein, also drops with the axle 25 away from the frame 15 while the tube 13 remains attached thereto, thereby causing the tube 13 to slide in a relatively upward direction through the clearance hole 29 in the block 31 until, at the maximum extended position as shown in FIGURE 2, the pin 19 urged by the biasing spring 21 moves into the indented area 17 of the tubular member 13 and drops into the vertical slot portion 35. Further lifting causes the wheels 23 to leave the ground and the vehicle with its cargo then becomes airborne.

When the target area is reached, the vehicle is dropped and impacts with the earth thereby causing the release of the energy stored therein by virtue of its position. The present invention absorbs and dissipates this energy by applying a constant retarding force to produce a constant deceleration of the load. When the wheel 23 first touches the ground, the pin 19 is locked in the indented area 17 as shown in FIGURE 2. The wheel 23, as well as the axle 25 and housing 27, immediately stop further movement but the frame 15 with the depending tubular member 13 attached thereto continues its downward motion. This causes the tubular member 13 to become collapsed by the interaction of the pin 19 therewith during the slide through the hole 29. This collapsing or deforming of the tubular member 13 requires energy which is supplied by the falling vehicle and the load energy forces are thereby absorbed by the progressive collapse and deformation of the tubular member 13. The position of the elements after the impact is shown in FIGURE 3.

Generally in the practice of the invention, there would be four tubular members employed, one at each wheel of the vehicle. The particular material used to fabricate the tubular members as well as the dimensional characteristics would depend upon the size and weight of the vehicle and the amount of energy to be absorbed. Also, the physical properties of the tubular member would affect the energy dissipation characteristics during deformation. Since the condition of the herein disclosed shock strut after impact has little or no effect upon the suspension system of the vehicle to which it is attached, the vehicle is ready for immediate use without requiring disconnection or removal of superfluous equipment or materials.

Having thus set forth and disclosed the nature of my invention, what I claim and desire to secure by Letters Patent of the United States is:

1. An energy absorption system for dissipating load energy forces generated by a falling vehicle, said absorption system comprising a plurality of tubular members extending perpendicularly downward from the frame of the vehicle, one of said tubular members being disposed near each wheel of the vehicle, a corresponding plurality of blocks fixedly attached to the axle of each wheel of the vehicle, each of said blocks having a clearance hole therethrough in axial alignment with each of said tubular members, each of said tubular members being slidably engaged with each of said corresponding blocks by passage through the clearance hole thereof, said axle being in maximum extended position away from said frame when the vehicle is off the ground, interference means disposed in each of said blocks including a movable pin and a biasing spring behind said pin, said biasing spring urging said pin toward said tubular member and into an indented area therein when said tubular member is in the fully withdrawn position, said interference means operating to deform said tubular members during passage through the clearance holes in said blocks as said frame and axle move toward each other after ground contact, thereby absorbing and dissipating the load energy forces generated by the falling vehicle.

2. The energy absorption system defined in claim 1 wherein each of said blocks includes a slanted passageway to guide the pin toward said tubular member and a vertical slot portion at the inward end of said slanted passageway for receiving the pin when the tubular member is in the fully withdrawn position, thereby positioning the pin in the indented area of said tubular member and in the area of the clearance hole causing said tubular member to be deformed during passage therethrough.

References Cited

UNITED STATES PATENTS

| 1,511,264 | 10/1924 | Carter | 188—129 |
| 3,132,721 | 5/1964 | Jackson | 188—129 |

DUANE A. REGER, *Primary Examiner.*